United States Patent

[11] 3,595,112

| [72] | Inventors | Robert P. De George<br>Kenmore;<br>James J. Pancook, Tonawanda, both of, N.Y. |
|---|---|---|
| [21] | Appl. No. | 801,280 |
| [22] | Filed | Feb. 24, 1969 |
| [45] | Patented | July 27, 1971 |
| [73] | Assignee | Houdaille Industries, Inc.<br>Buffalo, N.Y. |

[54] MACHINE-TOOL CLAMP ASSEMBLY
11 Claims, 2 Drawing Figs.

[52] U.S. Cl. ................................................. 83/62,
83/409, 83/453, 214/1.6, 269/137
[51] Int. Cl. ................................................. B26d 7/02
[50] Field of Search ................................... 83/62, 409,
410, 412, 413, 414, 415, 453, 458, 461, 396;
214/1.4—1.7; 269/136, 137

[56] References Cited
UNITED STATES PATENTS

| 1,796,939 | 3/1931 | Pollasky | 83/396 |
| 2,987,972 | 6/1961 | Schneider | 269/137 X |
| 3,456,536 | 7/1969 | Daniels | 83/62 |

Primary Examiner—James M. Meister
Attorney—Hill, Sherman, Meroni, Gross & Simpson ABSTRACT: A machine tool has a workpiece positioning mechanism including a carrier which is reciprocated in one axis to position the workpiece which is held by a clamp assembly. The clamp assembly is mounted on the carrier to be free to move vertically and has a resiliently yieldable bumper responsive to any obstruction. The clamp assembly includes a clamp member which moves in a direction which is inclined to the horizontal for drawing the workpiece against a locating surface on the clamp assembly. Both the actuator and the clamp member move in a direction which is inclined to the horizontal.

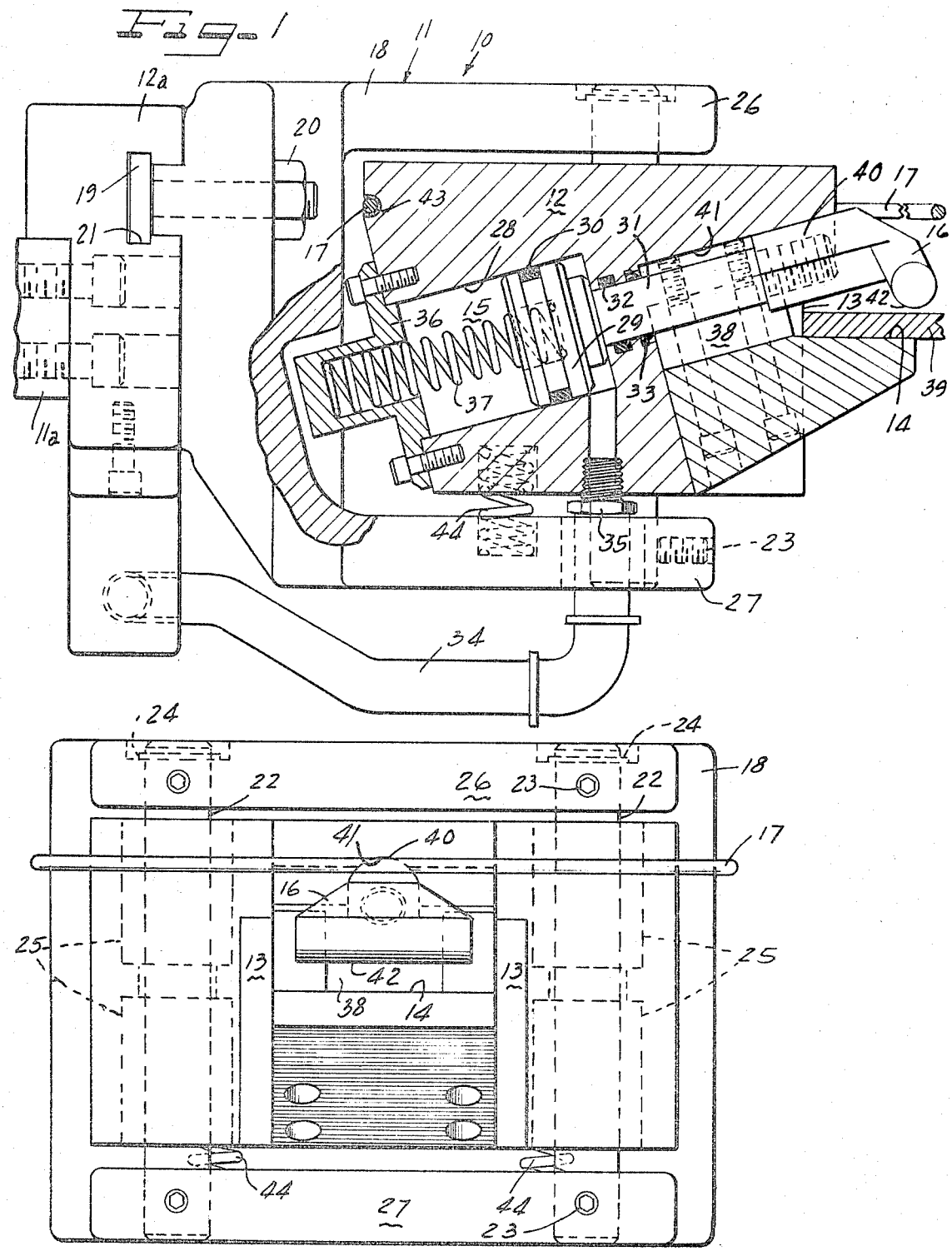

MACHINE-TOOL CLAMP ASSEMBLY

BACKGROUND OF THE INVENTION

1. Field of the Invention

This invention relates to a workpiece clamp assembly for use on a machine tool, by which clamp assembly the workpiece is grasped and moved about from position to position.

2. Prior Art

Prior devices of the type here involved with which we are familiar have had a degree of complexity in configuration which we have considered to be other than desirable.

SUMMARY

In accordance with the present invention, we have provided a particularly simple structure which has many advantages. A resiliently yieldable bumper is provided on the clamp assembly in an insulated manner so that by mere engagement and hence grounding with an obstacle, proper remedial action can be initiated. Further, the movable components move as a single piece while obtaining both vertical and horizontal clamping action for both clamping and locating a workpiece. Further, vertical guide rod means are provided with bearings within the clamp housing to minimize the height of the device.

Accordingly, it is an object of the present invention to provide a workpiece clamp assembly which may be employed to grasp a workpiece for moving it about and for moving it to and holding it in predetermined positions with respect to a machine tool.

A further object of the present invention is to provide a structure for initiating an appropriate remedy in the event that the workpiece clamp is moved in a collision course with an obstruction.

A further object of the present invention is to provide a workpiece clamp assembly of simplified construction.

A still further object of the present invention is to provide means by which certain nonparallelism is automatically corrected for.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

On the drawings:

FIG. 1 is a side elevational view, partly in cross section, of a workpiece clamp assembly provided in accordance with the principles of the present invention; and FIG. 2 is a front view thereof.

As shown on the drawings:

The principles of this invention are particularly useful when embodied in a workpiece clamp assembly for machine tools, generally indicated by the numeral 10. A typical machine tool which may employ this clamp assembly 10 to advantage is a numerically controlled punching machine which has a workpiece positioning mechanism that includes an elongated movable reciprocably driven member 11a to which is secured an elongated horizontally movable carrier 12a which is reciprocated along its length, namely perpendicular to the drawing as shown in FIG. 1.

The machine-tool clamp assembly 10 of this embodiment includes securing means generally indicated at 11, a housing 12 carrying locating means 13 and a jaw 14, a powered linear fluid actuator 15, a clamp member 16, and a resiliently yieldable bumper 17.

The securing means 11 includes a rigid adapter unit 18 which is secured by a T-bolt 19 and nut 20 to the movable carrier 12a, the head of the T-bolt 19 being in a T-slot 21 in the carrier 12a. As best seen in FIG. 2, the securing means 11 further includes a pair of vertical guide rod means 22 of circular cross section which are rigidly secured to the adapter 18 as by a number of setscrews 23, a pair of snaprings 24 providing temporary support for the vertical guide rods 22 during installation. The vertical guide rod means 22 have a sliding fit and with the housing 12 and to this end the securing means 11 further includes four sets of bearing means 25 of conventional construction acting between the guide rod means 22 and the housing 12.

The adapter unit 18 has an upper shelflike portion 26 and a lower similar portion 27 that respectively extend above and below the housing 12.

The housing 12 has a cylindrical bore 28 which forms a part of the actuator 15, the actuator 15 further including a piston 29 having an O-ring 30 in sliding sealing engagement with the bore 28, and a piston rod 31 which is slidably guided by the housing 12. An O-ring 32 acts between the housing 12 and the piston rod 31, and a wiper seal 33 keeps out contaminants from the O-ring 32. The actuator 15 may be pneumatically or hydraulically actuated and to that end a fluid line 34 communicates from a supply on the carrier 12a through a fitting 35 on the housing 12 to the rod end of piston 29. The actuator 15 has an end cap 36 which is elongated to accommodate a spring 37, the spring 37 comprising means reacting against the housing 12 and normally urging the clamp member 16 away from the jaw 14 as shown. The portion of the piston rod 31 extends outwardly from the wiper 33 is disposed in a cavity 38 in spaced relation to the housing 12 and the jaw 14.

The locating means 13 comprise a pair of plates secured to opposite sides of the housing 12, their forward edge serving as the actual locating means which is engageable with an edge of a workpiece 39.

The clamp member 16 is threaded to the piston rod 31. The upper half of the portion of the clamp member 16 that is disposed within the housing 12 is of semicircular cross section and comprises a generally upwardly directed bearing surface 40. The housing 12 has a complemental generally downwardly directed bearing surface 41 which is also therefore of semicircular cross section, and which bearing surface 41 serves as a reaction surface for reacting downwardly on the bearing surface 40 of the clamp member 16. The lower half of the portion of the clamp member 16 that enters the housing 12 can be of any configuration and merely enters the cavity 38.

The jaw 14 has an upwardly directed surface which engages one side, namely the lower side, of the workpiece 39. To support the jaw 14, it has a portion that extends between the two locating means 13, the upper portion thereof being bifurcated so that a pair of legs or spacers straddle and help define the cavity 38.

The clamp member 16 thus has a portion that projects from the housing 12 and which overlies the jaw 14, part of which can engage the opposite side of the workpiece 39 as explained below. With this construction, the clamp member 16 is actually guided and driven by the actuator so that both have a linear movement in a direction which is inclined to the horizontal. The angle is such that the horizontal vector of movement is greater than the vertical vector of movement. By this arrangement, when the clamp member 16 engages the workpiece 39, assuming that the workpiece 39 does not touch the locating surface 13, most of the movement is used for drawing the workpiece 39 frictionally against the locating surface 13. Once the locating surface 13 is engaged, the clamp member 16 may slide slightly along the surface of the workpiece 39, thereby positively assuring a good engagement. The daylight between the jaw 14 and the workpiece clamp member 16 when fully open as drawn exemplifies the maximum thickness of workpiece that this device can accommodate. The length of travel of the actuator 15 is such that even the thinnest workpiece will be engaged before all the travel has been used up.

The portion of the clamp member 16 that actually engages the workpiece has an elongated configuration as shown in FIG. 2 at 42 and in this embodiment is of semicylindrical configuration. As shown in FIG. 2, the transverse workpiece engaging portion 42 is parallel to the jaw 14. However, in the event that the workpiece were not of uniform thickness, any nonparallelism between the upper and lower sides of the workpiece would be automatically compensated for by the clamp member 16. The construction described above enables slight rocking of the clamp member 16 about its axis of longitudinal movement, along with slight rocking of the piston 29 to accommodate any slight variations of the type described.

The resiliently yieldable bumper 17 includes a portion shown in FIG. 1 which is spaced from that portion of the clamp member 16 that can overlie the workpiece 39. The bumper 17 is held by a means (not shown) on the housing 12, and there is interposed an electrical insulator 43. Thus the clamp member is adapted to be connected to a control for stopping the machine tool in response to the bumper 17 engaging any obstacle and hence becoming grounded, whereby such control is operated. By this construction, a safety is provided against incorrect programming, for protecting the machine tool. Yet such bumper 17 is actuated so seldom that complex switching structure is avoided.

A pair of springs 44 substantially center the housing 12 between the upper and lower arms 26 and 27, and enable the housing 12 to move upwardly or downwardly, rather than bend the workpiece, in the event that the space between the jaw 14 and the transverse workpiece engaging portion 42 is not perfectly aligned vertically with the workpiece.

The terms "horizontal" and "vertical" are used for convenience and describe the normal attitude of the disclosed components, but are used as terms of reference between components.

Although various minor modifications might be suggested by those versed in the art, it should be understood that we wish to embody within the scope of the patent warranted hereon, all such embodiments as reasonably and properly come within the scope of the appended claims.

We claim as our invention:

1. A clamp assembly for being attached to a horizontally movable carrier portion of a machine tool and for grasping a workpiece of sheet material, comprising:
   a. a housing having means by which it may be secured to the horizontally movable carrier portion;
   b. a jaw fixedly secured to said housing for engaging one side of the workpiece;
   c. a powered linear actuator carried by said housing with its axis inclined to the horizontal; and
   d. a clamp member having a portion disposed above said jaw for engaging the other side of the workpiece, said clamp member being connected to said actuator and being slidably guided and driven by said actuator for linear movement in a direction inclined to the horizontal;
   e. said clamp member having a generally upwardly directed bearing surface and said housing having a generally downwardly directed bearing surface, said bearing surfaces enabling said housing to act reactively in a downward direction on said clamp member.

2. A machine-tool clamp assembly according to claim 1, wherein said bearing surfaces have a semicircular cross section.

3. A machine-tool clamp assembly according to claim 2, wherein said clamp member has a semicylindrical surface directed toward said jaw.

4. A machine-tool clamp assembly according to claim 2, wherein said clamp member has an elongated transverse workpiece-engaging portion directed toward said jaw enabling slight rocking of said clamp member at said bearing surfaces in response to any nonparallelism between the length of said workpiece-engaging portion and the workpiece.

5. A clamp assembly for being attached to a horizontally movable carrier portion of a machine tool and for grasping a workpiece of sheet material, comprising:
   a. a housing having means by which it may be secured to the horizontally movable carrier portion;
   b. a jaw fixedly secured to said housing for engaging one side of the workpiece;
   c. a powered linear actuator carrier by said housing with its axis inclined to the horizontal;
   d. locating means on said housing for being engaged by an edge of the workpiece; and
   e. a clamp member having a portion disposed above said jaw for extending over said edge of the workpiece and for engaging the other side of the workpiece, said clamp member being connected to said actuator and being slidably guided and driven by said actuator for linear movement in a direction inclined to the horizontal, said clamp member, during clamping, being tensionably driven by said actuator and being so guided by said actuator that said linear movement both draws said workpiece edge against said locating means and forces said one side against said jaw.

6. A machine-tool clamp assembly according to claim 5, wherein said actuator has a piston rod in rigid threaded engagement with said clamp member.

7. A machine-tool clamp assembly according to claim 5, including a resiliently yieldable bumper carried by said housing and having a portion extending in spaced relation about that portion of said clamp member which can overlie the workpiece, said bumper being electrically insulated from said housing.

8. A clamp assembly for being attached to a horizontally movable carrier portion of a machine tool and for grasping a workpiece of sheet material, comprising:
   a. a housing;
   b. a rigid adapter having means for securing the adapter to the carrier portion;
   c. vertical guide rod means having a sliding fit with said housing and being rigidly secured to said adapter;
   d. a jaw fixedly secured to said housing for engaging one side of the workpiece;
   e. a powered linear actuator carried by said housing with its axis inclined to the horizontal; and
   f. a clamp member having a portion disposed above said jaw for engaging the other side of the workpiece, said clamp member being connected to said actuator and being slidably guided and driven by said actuator for linear movement in a direction inclined to the horizontal.

9. A machine-tool clamp assembly according to claim 8, including bearing means acting between said guide rod means and said housing.

10. A machine-tool clamp assembly according to claim 5, in which said clamp member is so guided as to enable slight rocking thereof and has an elongated workpiece engaging portion for automatically effecting such rocking.

11. A machine-tool clamp assembly according to claim 1 including a resiliently yieldable bumper carried by said housing and having a portion extending in spaced relation about that portion of said clamp member which can overlie the workpiece, said bumper being electrically insulated from said housing.